(12) United States Patent
Ramachandran

(10) Patent No.: US 9,689,584 B2
(45) Date of Patent: Jun. 27, 2017

(54) OPTIMIZING COMMUNICATION MODES IN WIRELESS-ENABLED CLIMATE CONTROL SYSTEM CONTROLLERS

(71) Applicant: Emerson Electric Co., St. Louis, MO (US)

(72) Inventor: Anil Ramachandran, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 626 days.

(21) Appl. No.: 14/014,193

(22) Filed: Aug. 29, 2013

(65) Prior Publication Data

US 2015/0066216 A1 Mar. 5, 2015

(51) Int. Cl.
*G05D 3/12* (2006.01)
*G05D 5/00* (2006.01)
*G05D 9/00* (2006.01)
*G05D 11/00* (2006.01)
*F24F 11/00* (2006.01)
(Continued)

(52) U.S. Cl.
CPC ......... *F24F 11/0086* (2013.01); *H04W 24/04* (2013.01); *H04W 52/0277* (2013.01); *F24F 2011/0068* (2013.01); *F24F 2011/0094* (2013.01); *Y02B 60/50* (2013.01)

(58) Field of Classification Search
CPC ........... F24F 11/0086; F24F 2011/0068; F24F 2011/0094; H04W 52/0277; H04W 24/04; Y02B 60/50
USPC ................... 700/276–286; 165/201; 236/1 C
See application file for complete search history.

(56) References Cited

U.S. PATENT DOCUMENTS

2008/0054084 A1\* 3/2008 Olson .................. F24F 11/0012
236/1 C
2008/0318535 A1\* 12/2008 Black ................ H04W 52/0277
455/127.5

(Continued)

OTHER PUBLICATIONS

Canadian Office Action issued in Canadian Patent Application No. 2,855,188 dated Jan. 18, 2016, which claims priority to the instant application; 4 pgs.

*Primary Examiner* — Ziaul Karim
(74) *Attorney, Agent, or Firm* — Harness, Dickey & Pierce, P.L.C.

(57) ABSTRACT

Disclosed are exemplary embodiments of system controllers and methods for controlling a climate control system. In an exemplary embodiment, a wireless-enabled climate system controller receives power from one or more power sources. A processor and memory of the controller are configured to monitor power budget availability from the power source(s) for performance of wireless communication by the climate control system controller. The processor and memory are further configured to determine power budget requirements for combinations of communication modes in which the controller is capable of performing wireless communication, and based on the monitoring and determining, configure the controller to perform wireless communication using a selected one of the communication mode combinations. A thermostat can optimize levels of operation and battery life, by determining an appropriate operating mode that could offer the most functionality while not exceeding the power budget available.

16 Claims, 2 Drawing Sheets

(51) Int. Cl.
    *H04W 24/04*         (2009.01)
    *H04W 52/02*         (2009.01)

(56) References Cited

U.S. PATENT DOCUMENTS

| | | | |
|---|---|---|---|
| 2011/0054699 A1* | 3/2011 | Imes | H04L 67/42 |
| | | | 700/276 |
| 2012/0233478 A1* | 9/2012 | Mucignat | H04L 12/2825 |
| | | | 713/320 |
| 2012/0248211 A1* | 10/2012 | Warren | F24F 11/0012 |
| | | | 236/1 C |
| 2012/0256009 A1* | 10/2012 | Mucignat | G05D 23/1905 |
| | | | 236/1 C |
| 2012/0267089 A1 | 10/2012 | Mucignat et al. | |
| 2012/0325919 A1* | 12/2012 | Warren | F24F 11/0012 |
| | | | 236/1 C |
| 2013/0140016 A1* | 6/2013 | Storm | F24F 11/006 |
| | | | 165/205 |

* cited by examiner

OPTIMIZING COMMUNICATION MODES IN WIRELESS-ENABLED CLIMATE CONTROL SYSTEM CONTROLLERS

FIELD

The present disclosure generally relates to climate control systems, and more particularly (but not exclusively) to optimizing communication modes in wireless-enabled controllers for climate control systems.

BACKGROUND

This section provides background information related to the present disclosure which is not necessarily prior art.

In many climate control systems, a thermostat typically switches on a heating or cooling load by using a relay or other switching device to connect an "R" (hot) wire to the appropriate load terminal, e.g., a "W" terminal wired to a furnace/air handler or a "Y" terminal wired to a heat pump/air conditioner. Historically, bimetal strips or mercury switches were used in thermostats to make such connections. These switching devices were passive and did not need to be connected to electrical power in order to operate. Since thermostats that used such devices did not need power, installers typically did not wire a common ("C") wire from the climate control system equipment to the thermostat.

SUMMARY

This section provides a general summary of the disclosure, and is not a comprehensive disclosure of its full scope or all of its features.

According to various aspects, exemplary embodiments are disclosed of system controllers and methods for controlling a climate control system. In an exemplary embodiment, a wireless-enabled climate system controller is configured to receive power from one or more power sources. The controller generally includes a processor and memory configured to monitor power budget availability from the power source(s) for performance of wireless communication by the climate control system controller. The processor and memory are further configured to determine power budget requirements for a plurality of combinations of communication modes in which the controller is capable of performing wireless communication, and based on the monitoring and determining, configure the controller to perform wireless communication using a selected one of the communication mode combinations.

In another exemplary embodiment, a wireless-enabled climate system controller is configured to receive power from one or more power sources. The controller generally includes a processor and memory configured to monitor power budget availability from the power source(s) to determine a change in power budget availability for performance of wireless communication by the climate control system controller. The processor and memory are further configured to determine power budget requirements for a plurality of combinations of wireless and network operating modes, where the controller is configurable to perform wireless communication using any one of the combinations, and based on the change, configure the controller to perform wireless communication using a selected one of the communication mode combinations.

In another exemplary embodiment, a method is provided for controlling a climate control system having one or more power sources. A controller of the climate control system monitors power budget availability from the one or more power sources. The controller determines power budget requirements for a plurality of combinations of communication modes in which the controller is capable of performing wireless communication. Based on the monitoring and determining, the controller dynamically uses a selected one of the communication mode combinations to perform wireless communication.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
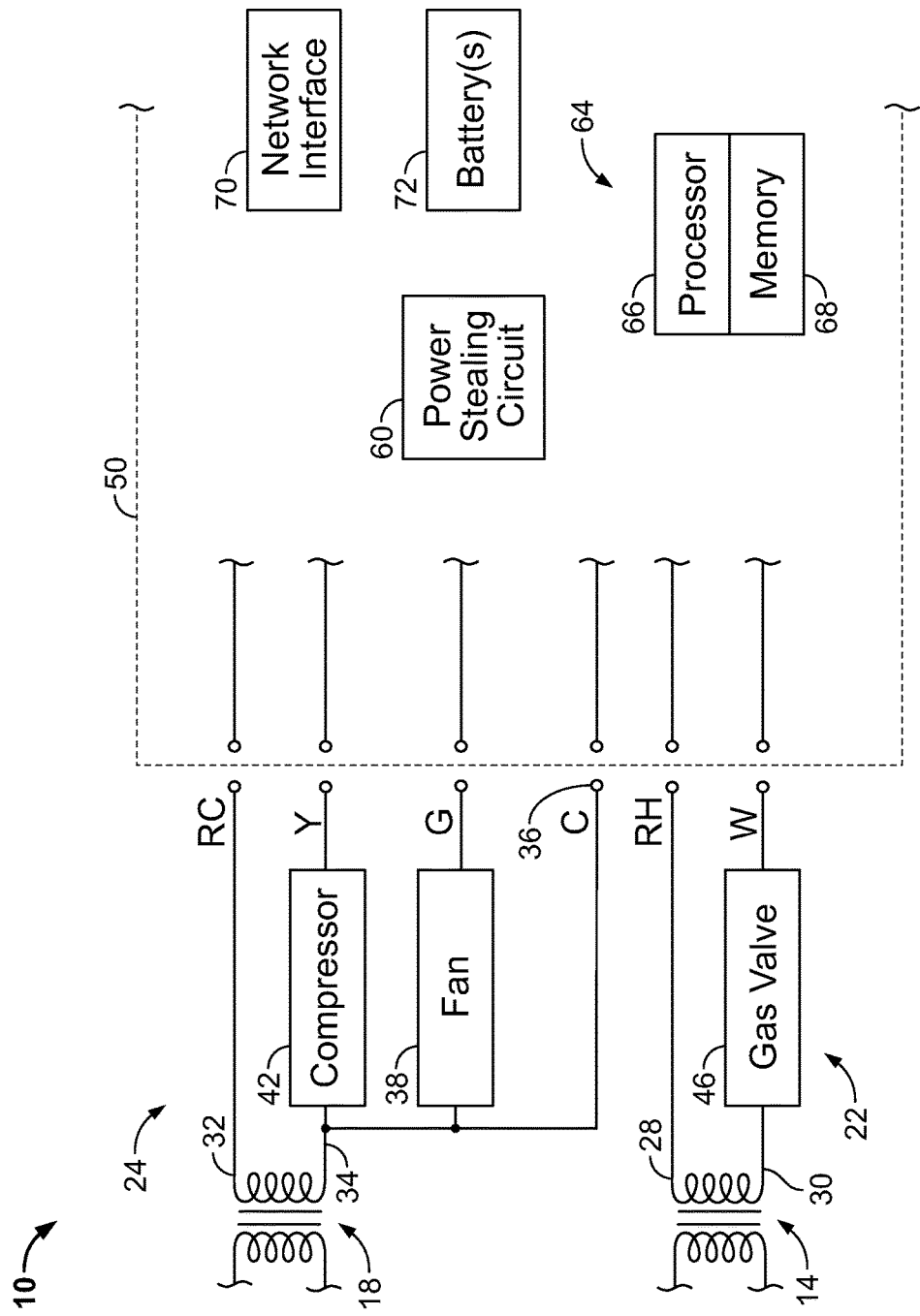
FIG. 1 is a diagram of an exemplary embodiment of a climate control system.

Example embodiments will now be described more fully with reference to the accompanying drawings.

The inventor hereof has recognized that a climate control system controller such as a thermostat may be capable of receiving operating power from more than one power source. For example, a thermostat being installed in a location where a C wire terminal is available can be connected to the terminal to receive some or all of its operating power through the C wire. Since a C wire is not always available, many thermostats have been designed to operate on battery power. Further, a thermostat may be configured to "power steal," e.g., to leak a small amount of current from an R wire through an HVAC load in an "OFF" mode without turning on the load. In such a thermostat, one or more energy storage components and/or digital circuits may be configured in the path of the small current to capture this energy. Such harvested energy could be used directly (e.g., stored in a short-term storage component to feed a power supply) and/or accumulated over a period of time into a power storage unit (e.g., a rechargeable battery) to cover power usage.

The inventor hereof also has recognized that wireless-enabled thermostats and other wireless-enabled climate control system controllers may operate in various communication modes. Communication modes include but are not necessarily limited to wireless modes and network modes. The term "wireless mode" is used herein to refer to a mode of operation in a wireless architecture, where the wireless architecture supports a network. A wireless mode may include, e.g., an operating mode in accordance with Institute of Electrical and Electronics Engineers (IEEE) 802.11 standards. The term "network mode" is used herein to refer to a mode of operation in a network that is provided over a wireless architecture. A network mode may include, e.g., an operating mode in accordance with Transmission Control Protocol/Internet Protocol (TCP/IP) protocols. The term "communication mode" is to be interpreted broadly in the present disclosure. It should be understood that although various embodiments may be described in the present disclosure and claims with reference to "wireless modes," "network modes," IEEE 802.11 standards and/or TCP/IP protocols, the disclosure is not so limited. Communication modes may be described with reference to various communication layer models, including but not limited to the Open Systems Interconnection (OSI) model, the TCP/IP model, and/or other models that may be well known in the art. Additionally or alternatively, in various embodiments communication modes may involve other or additional protocols and/or standards, e.g., Ethernet, Bluetooth, WiMax, etc. Thus the term "communication mode" can include any mode of operation for which a thermostat or other climate control system controller might be configured or configurable for performing communication in a wireless network as further discussed below.

Various communication modes can provide various levels of communication functionality for thermostats or other controllers. Various levels of power availability may be needed to support such communication modes. Accordingly, the inventor has developed and discloses herein exemplary embodiments in which a combination of communication modes may be dynamically selected, so as to optimize operation of a wireless-enabled climate control system controller such as a thermostat while remaining within a power budget that may be currently available.

In one example embodiment, a wireless-enabled climate control system controller is configured to receive power from one or more power sources. The controller, which may or may not be a thermostat, includes a processor and memory configured to monitor power budget availability from the power source(s) for performance of wireless communication by the climate control system controller. The processor and memory are also configured to determine power budget requirements for a plurality of combinations of communication modes in which the controller is capable of performing wireless communication. Based on the monitoring and determining, the processor may configure the controller to perform wireless communication using a selected one of the communication mode combinations.

With reference now to the figures, FIG. 1 illustrates an exemplary embodiment of a climate control system 10 embodying one or more aspects of the present disclosure. As shown in FIG. 1, the climate control system 10 includes two transformers 14 and 18 for providing power respectively to a heating subsystem 22 and a cooling subsystem 24. The heating subsystem transformer 14 has a hot (typically 24-volt) side 28 and a common, i.e., neutral, side 30. The cooling subsystem transformer 18 has a hot (typically 24-volt) side 32 and a common, i.e., neutral, side 34. The cooling subsystem 24 includes a fan 38 and a compressor 42 connected on the common side 34 of the transformer 18. The heating subsystem 22 includes a furnace gas valve 46 connected on the common side 30 of the heating subsystem transformer 14. In the present example, a C terminal 36 is provided from a common C wire connected, e.g., with the common side 34 of the transformer 18. It should be noted, however, that in various embodiments in accordance with the disclosure, a C terminal may not be provided.

In one example embodiment, a climate control system controller, e.g., a thermostat 50, is provided for controlling operation of the climate control system 10. The thermostat 50 may activate one or more relays and/or other switching devices(s) (not shown in FIG. 1) to activate the heating subsystem 22 or cooling subsystem 24. When, e.g., a user operates the thermostat 50 to cause the climate control system 10 to provide heating, the thermostat 50 turns on the heating subsystem 22 and gas valve 46 by using a relay or other switching device to connect a "hot" terminal RH to a load terminal W. To provide cooling, the thermostat 50 may turn on the compressor 42 and/or fan 38 by using one or more relays or other switching device(s) to connect a "hot" terminal RC to load terminals Y and/or G.

It should be noted generally that the thermostat 50 and/or other controller embodiments in accordance with various aspects of the disclosure could be installed in other types of climate control systems, including but not limited to systems having a single transformer, heat-only systems, cool-only systems, heat pump systems, etc. In some embodiments a C terminal may be provided, e.g., from the common side 30 of the transformer 14. In some other embodiments, a thermostat may not be provided with a connection to a common C wire. Further, although the climate control system 10 shown in FIG. 1 provides single-stage heat and single-stage cooling, in various embodiments a controller such as the thermostat 50 described herein may be provided in a climate control system having multiple stages of heating and/or cooling.

A power stealing circuit 60 may harvest power from the transformers 14 and/or 18 for the thermostat 50. Harvested power may be used for powering one or more components of the thermostat 50, which may include a control 64 having a processor 66 and memory 68, and a wireless network interface 70 that includes, e.g., a wireless transmitter and receiver. The wireless network interface 70 is configured to provide at least intermittent connection of the thermostat 50 in a wireless network, e.g., as further described below. In various embodiments the thermostat 50 includes an internal power source 72 (e.g., one or more replaceable batteries, etc.) The thermostat 50 includes one or more circuits (not shown) configured to determine the availability of power source(s) such as the power source 72, and to determine energy level(s) available from such power source(s).

Figure 2:
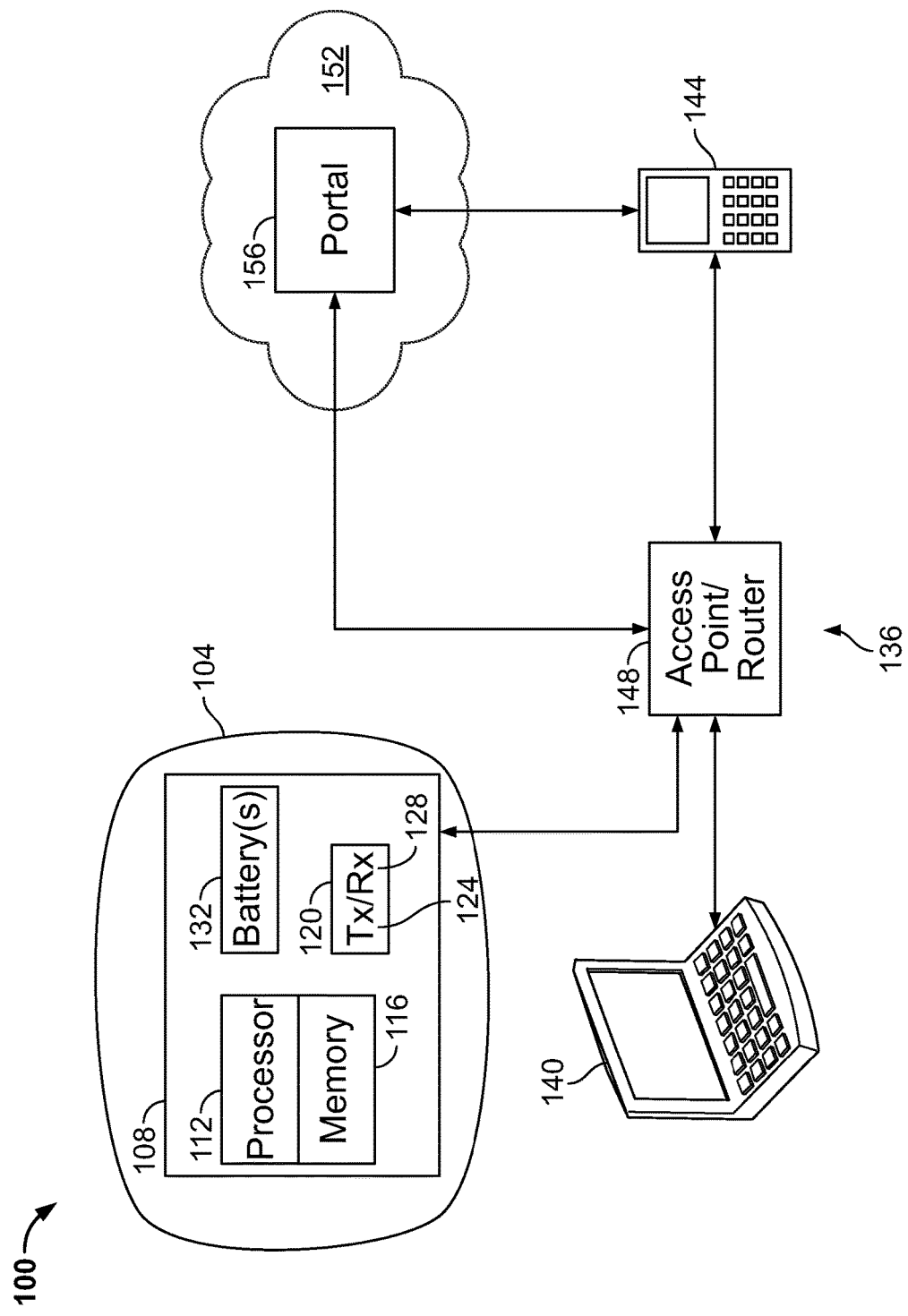
FIG. 2 is a diagram of an exemplary embodiment of a wireless network including a wireless-enabled climate control system controller.

An example embodiment of a wireless network is indicated generally in FIG. 2 by reference number 100. The network 100 is, e.g., a home network through which a user may manage climate control in the home using a wireless connection with a controller, e.g., a thermostat 104. The thermostat 104 includes a control 108 having a processor 112 and memory 116 and a network interface 120 having a transmitter 124 and receiver 128. The thermostat 104 also has a battery power source 132. In various implementations, at least one wireless-enabled user device 136 is connectable in the network 100 and may include, e.g., a laptop 140 and/or a smart phone 144. User devices 136 may additionally or alternatively include, e.g., home computers, personal computers (PCs), tablets, etc.

The network 100 also includes, e.g., an access point/router 148 that is, e.g., capable of communication with a wide-area network (WAN), e.g., the Internet 152. In some embodiments the home owner may have a user account, e.g., with an energy management service or utility. The home owner may use such an account, e.g., to track and/or manage energy usage in the home. In various embodiments the user account may be accessible through a web portal 156. Thus the home owner may use, e.g., the smart phone 144 and/or laptop 140 to remotely and/or locally track and/or manage energy usage in the home in communication with the thermostat 104 through the access point/router 148. In various embodiments, other, additional, or fewer devices may communicate with the thermostat 104 through the access point/router 148. Embodiments also are possible in which the thermostat 104 is capable of communicating with and/or through device(s) other than or in addition to the access point/router 148.

In various embodiments, a power budget of the thermostat 104 may vary over time dependent on a power mode of the thermostat, i.e., availability of power source(s) and amounts of power available through such available power source(s). Example power modes may include but are not limited to the following:

(a) Power is from a battery only, with a high battery level.
(b) Power is from a battery only, with a medium battery level.
(c) Power is from a battery only, with a low battery level.
(d) Power is from a battery only, with X milliamp-hours remaining.
(e) No battery is available, and AC 24V power is available.
(f) Battery power is available, e.g., as in modes (a), (b), (c), or (d) above, and AC 24V power is also available (e.g., using a C terminal.)
(g) Battery power is available, e.g., as in modes (a), (b), (c), or (d) above, and power stealing also is available (e.g., stealing from W or Y wires in OFF mode.)

The thermostat 104 could be configured for wireless communication in the network 100 in accordance with various communication modes. For example, with reference to wireless modes, e.g., operational modes in accordance with an IEEE 802.11 standard, the thermostat 104 may be alternatively configured to work in at least two modes, e.g., in an access point (AP) mode or in a station mode. In an AP mode, the thermostat 104 may be capable of allowing direct connections to the thermostat 104 from other devices acting in a station mode, whereas in a station mode, the thermostat 104 may associate to an 802.11 access point (AP), e.g., the access point/router 148. Such association would allow other devices, e.g., the laptop 140, to connect to the thermostat 104 through the access point/router 148. In one embodiment, when the thermostat 104 is in an AP mode, the receiver 128 of the thermostat 104 is kept active continuously. In various embodiments in which the thermostat 104 may be in operation as an Internet-connected thermostat, operation of the thermostat 104 in an AP mode would probably be less optimal than operation of the thermostat 104 in a station mode. If the thermostat 104 operates in a station mode, alternative modes for the thermostat 104 may include but are not necessarily limited to the following:

a) The thermostat 104 may have 802.11 communication disabled.
b) The thermostat 104 may have its receiver 128 ON continuously.
c) The thermostat 104 may enter an 802.11 powersave mode so that the thermostat 104 can operate at a low power level compared to full ON, with the associated AP, e.g., the access point/router 148, guaranteed to buffer packets between beacons, providing relatively low latency responsiveness at a fraction of a power budget required to keep the receiver 128 ON continuously.
d) Alternatively, the thermostat 104 may enter a low power mode with its wireless receiver 128 and transmitter 124 off for an appropriate duration of time, e.g., thirty (30) seconds, wake up periodically or on the occurrence of certain events and perform a communication task involving transmission and/or reception, and then go back to low power mode with its receiver 128 and transmitter 124 off. If upon wakeup the thermostat 104 discovers that the access point/router 148 treats the thermostat 104 as still being associated to the access point/router 148, the thermostat 104 can perform its communication task without re-associating with the access point/router 148. If, however, the thermostat 104 has been disassociated, the thermostat 104 may re-associate with the access point/router 148 to perform the communication task.

With reference, e.g., to TCP/IP modes, in various embodiments client-server communication may be performed, e.g., over a wireless architecture provided in accordance with 802.11 standards. For example, the thermostat 104 could operate as a server and allow a communicating entity to connect to it, or the thermostat 104 could operate as a client and initiate such a connection. If the thermostat 104 operates as a server, it always is available for a client to create a connection and communicate with the thermostat 104. If, on the other hand, the thermostat 104 operates as a client, alternatives include the following:

a) The thermostat 104 could operate as a persistent client. That is, the thermostat 104 as client of a server could start an application session, e.g., using TCP or UDP. The associated server would be aware that the client thermostat 104 would be persistently available for communication. The server thus could send a packet to the client thermostat 104 at any time.
b) The thermostat 104 could operate as a non-persistent client. That is, the server would be aware that the client thermostat 104 would not always be available, but would be available only in time windows explicitly offered by the client thermostat 104.

In various embodiments, an appropriate selection of, e.g., 802.11 and TCP/IP operating modes for a given device is supported by analysis of power modes and power budgets for the device. Moreover, in some embodiments, mutual exclusions existent among operating modes are taken into account in making an appropriate selection. In one embodiment, mutual exclusions in 802.11 modes and TCP/IP modes are considered. As one example, entry by a device into extended low power mode in 802.11 station mode operation is not compatible with a persistent TCP/IP connection. The device will not always be available, and the absence of responses to any packets sent by a server pursuant to TCP/IP while the device is asleep may result in disassociation from an AP pursuant to 802.11 as the AP recognizes that the device is not available. Such a sequence can increase latency and power consumption when the device wakes up, since the device then has to re-associate with the AP. As another example, it is likely that it would not be optimal to combine a non-persistent TCP/IP mode with an always-on or powersave 802.11 mode. The almost-instant availability typically generated by 802.11 always-on or powersave modes could be wasted if a device were to operate in a non-persistent client mode.

Accordingly, in various implementations, a power budget requirement is determined for each communication mode combination, e.g., for each 802.11 and TCP/IP mode combination, that may be usable in a given controller. Also determined is power budget availability, i.e., a power budget that would be available or allowed to be used, in each power mode of the given controller. In various embodiments, the power budget requirements determined for each usable communication mode combination are matched with the power budget availability determined for each power mode, to provide a basis for determining a currently optimal combination of communication modes. Examples of power mode power budget availability are set forth in Table 1. Examples of power budget requirements for communication mode combinations are set forth in Table 2. It should be understood that Tables 1 and 2 are exemplary only, and that other or additional modes, mode combinations, and/or power budget values may be used in various embodiments.

TABLE 1

| POWER MODE | POWER BUDGET AVAILABLE (in mW) |
|---|---|
| Battery only with high battery level | 0.2 |
| Battery only with medium battery level | 0.15 |
| Battery only with low battery level | 0.1 |
| Battery only with X mAh remaining | Function Powerbudget(X) = powerbudgetfunction(X) |
| AC 24 V present | 1000 |
| Power stealing present | 30 |

TABLE 2

| 802.11 MODE | TCP/IP MODE | POWER BUDGET REQUIREMENT (in mW) |
|---|---|---|
| 802.11 disabled | Non-existent | 0 |
| 802.11 ON continuously | Persistent client | 330 |
| 802.11 powersave mode | Persistent client | 16 |
| 802.11 periodic mode with X-second sleep interval | Non-persistent client | Function Poweruse(X) = Proprietarypowerfunction(X) |

What might be an optimal communication mode combination at one time during controller operation could change over time in relation to changing power modes, e.g., in embodiments where a controller's battery power source gradually loses charge, power stealing levels are increased or decreased, etc. Accordingly, and in various embodiments, determinations of optimal communication mode combinations may be made dynamically, based on monitoring performed while the controller is in operation. As shown in the examples of Tables 1 and 2, algorithms may be used to determine, e.g., available and/or required power budget values based on given time periods, milliamp-hours, etc.

In a climate control system in which optimizing is performed in accordance with embodiments of the present disclosure, a simplifying assumption may be applied, i.e., that a controller's use of a higher power level makes possible a higher level of controller functionality than would be possible through the controller's use of a lower power level. Accordingly, in some embodiments a controller may select the highest power-using operating mode, and/or the highest power-using operating mode combination, that fits within a power budget allowed by the power mode in which that controller is currently operating.

Moreover, if a controller is or becomes aware of actions it initiates that could cause the current power mode to change from a higher power budget to a lower power budget, the controller could proactively switch an operating mode, a parameter of an operating mode, and/or an operating mode combination before the change to the power mode occurs that would lower the power budget. For example, if a controller is about to switch ON the only HVAC output from which power stealing is available, and switching the output to ON is about to make power stealing unavailable, the controller may pre-calculate an upcoming power budget and switch to an operating mode combination that fits within those constraints before switching ON the HVAC output. As another example, a controller may proactively adjust one or more parameters related to modes, to keep power usage within a power budget as the power budget evolves. For example, the power budget available from a battery may decrease as the battery drains. The controller thus may proactively adjust parameter(s) such as a periodicity of communication, to maintain power consumption under the power budget.

In one example embodiment, a thermostat or other HVAC equipment controller may or may not include a battery power source. The thermostat includes a power stealing circuit configured, e.g., to steal power from a 24 VAC circuit. By configuring the thermostat to perform wireless communication using a combination of an IEEE 802.11 powersave mode with a TCP/IP persistent client mode, persistent connectivity of the thermostat to a remote server may be accomplished in the absence of a 24 VAC common wire connected to the thermostat.

In another example embodiment, a thermostat or other HVAC equipment controller includes a battery power source and/or a power stealing circuit. The thermostat is configured to perform wireless communication using, e.g., a combination of a TCP/IP non-persistent client mode with an 802.11 periodic mode that provides an appropriately long sleep period and periodic or event-based communication windows to a server. Such a configuration can provide an improved battery lifetime and also allow communication to be maintained with a reasonable communication periodicity.

Various embodiments in accordance with the disclosure provide a logical, systematic method for determining appropriate 802.11 and TCP/IP operating modes based on the power mode of a thermostat or other climate control system controller. The foregoing systems and methods make it possible for a thermostat or other controller to optimize levels of operation and battery life, by determining an appropriate operating mode that could offer the most functionality while not exceeding the power budget available.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wireless-enabled climate control system controller configured to receive power from one or more power sources, the controller comprising a processor and memory configured to:
   monitor power budget availability from the one or more power sources for performance of wireless communication by the controller as part of the climate control system;
   determine power budget requirements for each of a plurality of predefined combinations of communication modes in which the controller is capable of performing wireless communication, where each predefined combination of communication modes is predefined as a combination of wireless and network modes of operation, the wireless mode of operation defined in accordance with protocols of a wireless architecture and including one or more of the following: an 802 mode, and a Bluetooth mode, the network mode of operation defined in accordance with protocols of a network supported by the wireless architecture, the network mode including one or more of the following: a TCP mode, a UDP mode, and an IP mode; and based on the monitoring and determining, select one of the predefined communication mode combinations and configure the controller to perform wireless communication using together the wireless and network modes of the selected one of the predefined communication mode combinations;

the processor and memory further configured to:
anticipate change in the power budget availability; and
in response to the anticipating, (a) adjust one or more parameters relating to a mode included in the selected one of the predefined communication mode combinations and/or (b) configure the controller to perform wireless communication using a different one of the predefined communication mode combinations.

2. The controller of claim 1, wherein the change in the power budget availability includes a decreasing power budget, and the processor and memory are configured to adjust a periodicity of communication by the controller.

3. The controller of claim 1, wherein the one or more power sources include one or more of the following: a battery, an AC voltage supply, and a power stealing circuit.

4. The controller of claim 1, wherein the one or more power sources include a power stealing circuit, and the processor and memory are configured to, based on the monitoring and determining, configure the controller to perform wireless communication using a predefined communication mode combination of an 802.11 powersave mode and a TCP/IP persistent client mode, where the wireless communication is performable as to a remote server without a C wire being available to the controller.

5. The controller of claim 1, wherein the one or more power sources consist of a battery and/or power stealing circuit, and the controller is configured in the selected communication mode combination to repetitively:
sleep for a time period, wake up, and enter a wireless communication window.

6. A wireless-enabled climate control system controller configured to receive power from one or more power sources, the controller comprising a processor and memory configured to:
monitor power budget availability from the one or more power sources to determine a change in power budget availability for performance of wireless communication by the controller as part of the climate control system;
determine power budget requirements for each of a plurality of predefined combinations of wireless and network operating modes, where the controller is configurable to perform wireless communication using any one of the predefined combinations, where each predefined combination is predefined as a combination of (a) a wireless mode of operation in accordance with protocols of a wireless architecture and including one or more of the following: an 802 mode, and a Bluetooth mode, together with (b) a network mode of operation in accordance with protocols of a network supported by the wireless architecture, the network mode including one or more of the following: a TCP mode, a UDP mode, and an IP mode; and
based on the change, select one of the predefined combinations and configure the controller to perform wireless communication using together the wireless and network modes of the selected one of the predefined combinations;
the processor and memory further configured to:
anticipate change in the power budget availability; and
in response to the anticipating, (a) adjust one or more parameters relating to a mode included in the selected one of the predefined combinations and/or (b) configure the controller to perform wireless communication using a different one of the predefined combinations.

7. The controller of claim 6, wherein at least one of the predefined combinations comprises an 802.11 mode and a TCP/IP mode.

8. The controller of claim 7, wherein the 802.11 mode comprises a powersave mode or a periodic mode.

9. The controller of claim 7, comprising a thermostat, and wherein: the 802.11 mode comprises a powersave mode or a periodic mode; and the TCP/IP mode comprises a persistent client mode or a non-persistent client mode.

10. The controller of claim 7, wherein the TCP/IP mode comprises a persistent client mode or a non-persistent client mode.

11. The controller of claim 6, comprising a thermostat.

12. The controller of claim 6, wherein the processor and memory are configured to select the highest power-using predefined combination that does not exceed a power budget allowed by a power mode in which the controller currently operates.

13. A method of controlling a climate control system having one or more power sources, the method comprising:
a controller of the climate control system monitoring power budget availability from the one or more power sources;
the controller determining power budget requirements for each of a plurality of predefined combinations of communication modes in which the controller is capable of performing wireless communication, where each predefined combination of communication modes is predefined as a combination of wireless and network modes of operation, the wireless mode of operation defined in accordance with protocols of a wireless architecture and including one or more of the following: an 802 mode, and a Bluetooth mode, the network mode of operation defined in accordance with protocols of a network supported by the wireless architecture, the network mode including one or more of the following: a TCP mode, a UDP mode, and an IP mode; and
based on the monitoring and determining, the controller dynamically selecting one of the predefined communication mode combinations and using together the wireless and network modes of the selected one of the predefined communication mode combinations to perform wireless communication;
the method further comprising:
the controller anticipating change in the power budget availability; and
in response to the anticipating, the controller (a) adjusting one or more parameters relating to a mode included in the selected one of the predefined combinations and/or (b) performing wireless communication using a different one of the predefined combinations.

14. The method of claim 13, further comprising the controller excluding a combination of modes from the plurality of predefined combinations where the modes would produce incompatible results.

15. The method of claim 13, performed when power availability is changing or is about to change in the climate control system.

16. The method of claim 13, performed by a thermostat.

* * * * *